United States Patent
Baasch et al.

(10) Patent No.: US 11,353,115 B2
(45) Date of Patent: Jun. 7, 2022

(54) ROTARY CONTROL VALVE HAVING MINIMIZED INTERNAL FLUID LEAK RATE WHEN CLOSED

(71) Applicant: Vector Horizon Technology, LLC, Bowling Green, KY (US)

(72) Inventors: Oswaldo Baasch, Bowling Green, KY (US); Stefan B. Holder, Alvaton, KY (US); Casey Thomas, Bowling Green, KY (US); Jon A. Bigley, Bowling Green, KY (US)

(73) Assignee: Vector Horizon Technology, LLC, Bowling Green, KY (US)

( * ) Notice: Subject to any disclaimer, the term of this patent is extended or adjusted under 35 U.S.C. 154(b) by 0 days.

(21) Appl. No.: 16/842,703

(22) Filed: Apr. 7, 2020

(65) Prior Publication Data
US 2021/0310563 A1 Oct. 7, 2021

(51) Int. Cl.
*F16K 1/226* (2006.01)
*F16K 1/22* (2006.01)
(Continued)

(52) U.S. Cl.
CPC .......... *F16K 1/2268* (2013.01); *F02D 9/106* (2013.01); *F02D 9/1045* (2013.01);
(Continued)

(58) Field of Classification Search
CPC ........ F16K 1/2268; F16K 1/226; F16K 1/223; F16K 1/224; F02D 9/109; F02D 9/1015;
(Continued)

(56) References Cited

U.S. PATENT DOCUMENTS 2,999,512 A * 9/1961 Barkow .................. B23Q 5/26
137/614.16
3,280,843 A * 10/1966 Rutherford ........... F16K 31/122
137/625.47

(Continued)

FOREIGN PATENT DOCUMENTS

BE 664916 A 10/1965
CN 201273229 Y 7/2009
(Continued)

OTHER PUBLICATIONS

International Search Report received for PCT/US2021/021685 dated Jun. 18, 2021.
(Continued)

*Primary Examiner* — John Bastianelli
(74) *Attorney, Agent, or Firm* — Marshall, Gerstein & Borun LLP (57) ABSTRACT

A rotary control valve that includes a valve body, a valve shaft disposed within a bore of the valve body, a first valve seat disposed within the valve body, a first control element carried by the valve shaft, and a first pressure labyrinth at least partially defined by the first control element. The first control element is movably disposed in the first opening between a closed position, in which the first control element sealingly engages the first valve seat, thereby closing the first opening, and an open position, in which the first control element is spaced from the first valve seat, thereby opening the first opening. When the first control element is in the closed position, the first pressure labyrinth is configured to cause a pressure drop in fluid flowing therethrough, thereby minimizing an internal leak rate of the rotary control valve.

19 Claims, 4 Drawing Sheets

(51) Int. Cl.
*F02D 9/10* (2006.01)
*F02M 26/70* (2016.01)
*F02M 26/72* (2016.01)

(52) U.S. Cl.
CPC ........... *F02D 9/1095* (2013.01); *F02M 26/70* (2016.02); *F02M 26/72* (2016.02); *F16K 1/223* (2013.01); *F16K 1/224* (2013.01)

(58) Field of Classification Search
CPC ...... F02D 9/1045; F02D 9/106; F02D 9/1095; F02M 26/70; F02M 26/72
USPC ............................ 251/305–308; 123/336–337
See application file for complete search history.

(56) References Cited

U.S. PATENT DOCUMENTS

| | | | | |
|---|---|---|---|---|
| 4,022,424 A | * | 5/1977 | Davis | F16K 1/2268 251/214 |
| 4,304,392 A | * | 12/1981 | Maciulaitis | F16K 1/2285 251/173 |
| 4,353,388 A | * | 10/1982 | Isoyama | F16K 1/2268 137/240 |
| 4,821,954 A | * | 4/1989 | Bowder | F16K 31/003 236/48 R |
| 5,678,594 A | * | 10/1997 | Hill | F16K 27/062 137/338 |
| 6,263,917 B1 | * | 7/2001 | Evans | F02D 9/101 137/595 |
| 6,622,696 B2 | * | 9/2003 | Witzel | F02D 9/16 123/337 |
| 6,698,717 B1 | * | 3/2004 | Brookshire | F02D 9/1045 251/305 |
| 2017/0268466 A1 | * | 9/2017 | Lim | F16K 31/043 |

FOREIGN PATENT DOCUMENTS

| | | |
|---|---|---|
| DE | 102015015242 A1 | 5/2017 |
| GB | 2495220 A | 4/2013 |

OTHER PUBLICATIONS

Written Opinion received for PCT/2021/021685 dated Jun. 18, 2021.

\* cited by examiner

ROTARY CONTROL VALVE HAVING MINIMIZED INTERNAL FLUID LEAK RATE WHEN CLOSED

FIELD OF THE DISCLOSURE

The present patent relates generally to rotary control valves and, in particular, to a rotary control valve that has a minimized internal fluid leak rate when closed.

BACKGROUND OF THE DISCLOSURE

Process control systems often employ rotary valves, such as ball valves, butterfly valves, eccentric-disk valves, eccentric-plug valves, etc., to control the flow of process fluids. Rotary valves typically include a valve trim assembly having a valve seat disposed in the fluid path and surrounding a flow aperture, and a control element (e.g., a disk, a ball, etc.) disposed in the fluid path and rotatably coupled to the body of the valve via a valve shaft. To control the flow of fluid through some rotary valves, the position of the control element may be varied from a closed position at which the control element is in sealing engagement with the valve seat, thereby preventing fluid flow through the flow aperture, to a fully open or maximum flow rate position at which the control element is spaced away from the valve seat, thereby allowing fluid flow through the flow aperture. However, in many cases, even when the control element is in the closed position (in sealing engagement with the valve seat), considerable leakage around the control element can still occur, particularly where the control element meets the valve shaft and/or the valve seat. In turn, the rotary valves that experience this leakage have an internal leak rate (i.e., a closed internal leak rate) that is higher than an acceptable or threshold internal leak rate for a given application, such that those rotary valves are no longer usable for that given application.

SUMMARY OF THE DISCLOSURE

In accordance with a first aspect of the present disclosure a rotary control valve is provided. The rotary control valve includes a valve body that includes a bore and a first opening disposed adjacent to the bore. The rotary control valve also includes a valve shaft disposed within the bore, a first valve seat disposed within the valve body, and a first control element carried by the valve shaft. The first control element is movably disposed in the first opening between a closed position, in which the first control element sealingly engages the first valve seat, thereby closing the first opening, and an open position, in which the first control element is spaced from the first valve seat, thereby opening the first opening. The rotary control valve further includes a first pressure labyrinth at least partially defined by the first control element. When the first control element is in the closed position, the first pressure labyrinth is configured to cause a pressure drop in fluid flowing therethrough, thereby minimizing an internal leak rate of the rotary control valve.

In accordance with a second aspect of the present disclosure, a rotary control valve is provided. The rotary control valve includes a valve body that includes a bore, a first opening disposed adjacent to the bore, and a first shelf extending inwardly into the first opening. The rotary control valve also includes a valve shaft disposed within the bore. The valve shaft extends along a longitudinal axis and the first shelf extends along an axis that is perpendicular to the longitudinal axis. The rotary control valve also includes a first control element carried by the valve shaft, the first control element movably disposed in the first opening between a closed position, in which the first control element sealingly engages the first shelf, thereby closing the first opening, and an open position, in which the first control element is spaced from the first shelf, thereby opening the first opening. The rotary control valve further includes a first alignment element surrounding the valve shaft and disposed in the bore, and a first pressure labyrinth defined between the first control element and the first alignment element. When the first control element is in the open position, the first pressure labyrinth is configured to cause a pressure drop in fluid flowing therethrough, thereby reducing an internal leak rate of the rotary control valve.

In accordance with a third aspect of the present disclosure, a rotary control valve is provided. The rotary control valve includes a valve body that includes a bore, a first opening disposed adjacent to the bore, and a second opening disposed adjacent to the bore and spaced from the first opening. The rotary control valve also includes a first valve seat disposed within the first opening, a second valve seat disposed within the second opening, a valve shaft disposed within the bore, and a first control element carried by the valve shaft. The first control element is movably disposed in the first opening between a closed position, in which the first control element sealingly engages the first valve seat, thereby closing the first opening, and an open position, in which the first control element is spaced from the first valve seat, thereby opening the first opening. The rotary control valve also includes a second control element carried by the valve shaft, the second control element movably disposed in the first opening between a closed position, in which the second control element sealingly engages the second valve seat, thereby closing the second opening, and an open position, in which the second control element is spaced from the second valve seat, thereby opening the second opening. The rotary control valve further includes a first pressure labyrinth at least partially defined by the first control element, and a second pressure labyrinth at least partially defined by the second control element. When the first control element is in the open position, the first pressure labyrinth is configured to cause a pressure drop in fluid flowing therethrough, and the second pressure labyrinth is configured to cause a pressure drop in fluid flowing therethrough, thereby minimizing an internal leak rate of the rotary control valve.

In further accordance with the foregoing first, second and/or third aspects, a rotary control valve may further include any one or more of the following preferred forms.

In one preferred form, the rotary control valve may further include a first alignment element (e.g., a first bushing) surrounding the valve shaft and disposed in the bore. The first pressure labyrinth may be defined between the first control element and the first alignment element.

In another preferred form, the first control element may have an end portion and the first alignment element may have an end portion that is at least partially nested within the end portion of the first control element. The first pressure labyrinth may be defined between the end portion of the first control element and the end portion of the first alignment element.

In another preferred form, the valve body may further include a first shelf extending inwardly into the first opening. The first shelf may define the first valve seat.

In another preferred form, when the first control element is in the closed position, the first control element may be at least partially flush against the first shelf.

In another preferred form, the valve shaft may extend along a longitudinal axis, and the first shelf may extend along an axis that is perpendicular to the longitudinal axis.

In another preferred form, the valve body may further include a second opening disposed adjacent to the bore and spaced from the first opening. The rotary control valve may further include a second valve seat disposed within the bore and a second control element carried by the valve shaft, the second control element movably disposed in the second opening between a closed position, in which the second control element sealingly engages the second valve seat, thereby closing the second opening, and an open position, in which the second control element is spaced from the second valve seat, thereby opening the second opening. The rotary control valve may further include a second pressure labyrinth at least partially defined by the second control element, wherein when the second control element is in the closed position, the second pressure labyrinth is configured to cause a pressure drop in fluid flowing therethrough.

In another preferred form, the rotary control valve may further include a first alignment element surrounding the valve shaft and disposed in the bore, wherein the first pressure labyrinth is defined between the first control element and the first alignment element. The rotary control valve may further include a second alignment element surrounding the valve seat and disposed in the bore, wherein the second pressure labyrinth is defined between the second control element and the second alignment element.

In another preferred form, the rotary control valve may further include a rotary actuator coupled to the valve body, the rotary actuator operatively coupled to the first control element via the valve shaft.

In another preferred form, when the first control element is in the closed position, the first control element is at least partially flush against the first shelf.

In another preferred form, the valve body may further include a second opening disposed adjacent to the bore and spaced from the first opening. The rotary control valve may further include a second shelf extending inwardly into the second opening and a second control element carried by the valve shaft, the second control element movably disposed in the second opening between a closed position, in which the second control element sealingly engages the second valve seat, thereby closing the second opening, and an open position, in which the second control element is spaced from the second valve seat, thereby opening the second opening. The rotary control valve may further include a second pressure labyrinth at least partially defined by the second control element, wherein when the second control element is in the closed position, the second pressure labyrinth is configured to cause a pressure drop in fluid flowing therethrough.

In another preferred form, the rotary control valve may further include a second alignment element surrounding the valve seat and disposed in the bore, wherein the second pressure labyrinth is defined between the second control element and the second alignment element.

In another preferred form, the rotary control valve may further include a first alignment element surrounding the valve shaft and disposed in the bore, wherein the first pressure labyrinth is defined between the first control element and the first alignment element. The rotary control valve may further include a second alignment element surrounding the valve seat and disposed in the bore, wherein the second pressure labyrinth is defined between the second control element and the second alignment element.

In another preferred form, the first control element may have an end portion and the first alignment element may have an end portion that is at least partially nested within the end portion of the first control element, wherein the first pressure labyrinth is defined between the end portion of the first control element and the end portion of the first alignment element, wherein the second control element has an end portion and the second alignment element has an end portion that is at least partially nested within the end portion of the second control element, and wherein the second pressure labyrinth is defined between the end portion of the second control element and the end portion of the second alignment element.

In another preferred form, the valve body may further include first and second shelves extending inwardly into the first and second openings. The first shelf may define the first valve seat and the second shelf may define the second valve seat.

In another preferred form, when the first control element is in the closed position, the first control element is at least partially flush against the first shelf, and when the second control element is in the closed position, the second control element is at least partially flush against the second shelf.

In another preferred form, the valve shaft may extends along a longitudinal axis, and the first and second shelves m respectively extend along first and second axes, each of the first and second axes being perpendicular to the longitudinal axis.

DETAILED DESCRIPTION

The present disclosure is directed to a rotary control valve that minimizes, if not virtually eliminates, the fluid leakage that occurs in conventional rotary control valves when those rotary control valves are closed. The rotary control valve disclosed herein is intended to be utilized with a vehicle (e.g., a diesel vehicle, a commercial vehicle) to, for example, control exhaust fluid flow recirculation (e.g., in an engine in a diesel vehicle), such that the rotary control valve minimizes fluid leakage during exhaust fluid flow recirculation. Nonetheless, it will be appreciated that the rotary control valve can be utilized in other industries, including, for example, oil & gas, food & beverage, fluid control, etc.

FIGS. 1-5 illustrate one example of a rotary control valve 100 constructed in accordance with the principles of the present disclosure. The rotary control valve 100 generally includes a valve body 104, an actuator 108 that is coupled to the valve body 104 (e.g., via bolts), and a valve trim assembly 112 that is coupled to the valve body 104 and the actuator 108 to control the flow of fluid through the valve body 104. The actuator 108 may, for example, be an electric actuator, a mechanical actuator, a pneumatic actuator, a hydraulic actuator, or some other type of suitable actuator.

Figure 1:
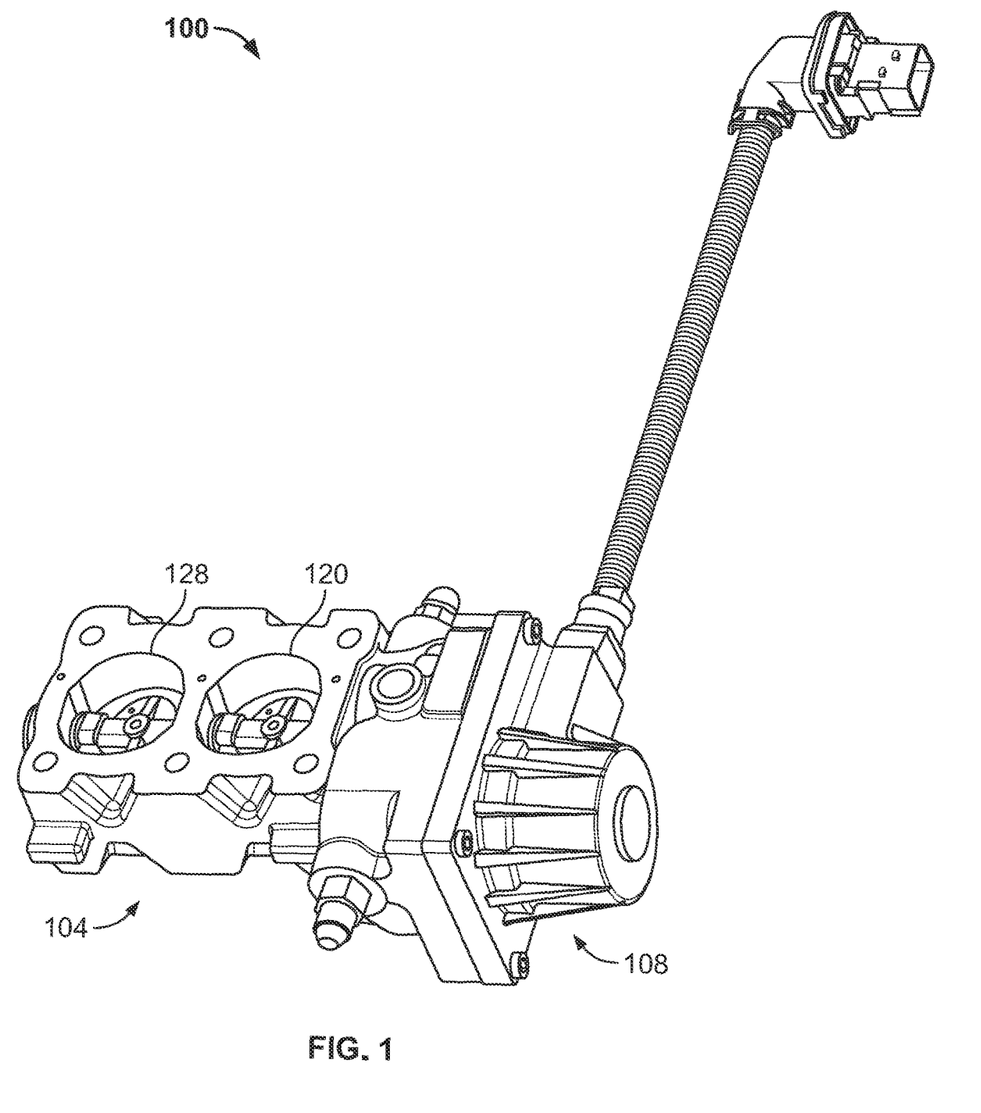
FIG. 1 is a perspective view of one example of a rotary control valve constructed in accordance with the principles of the present disclosure.
Figure 2:
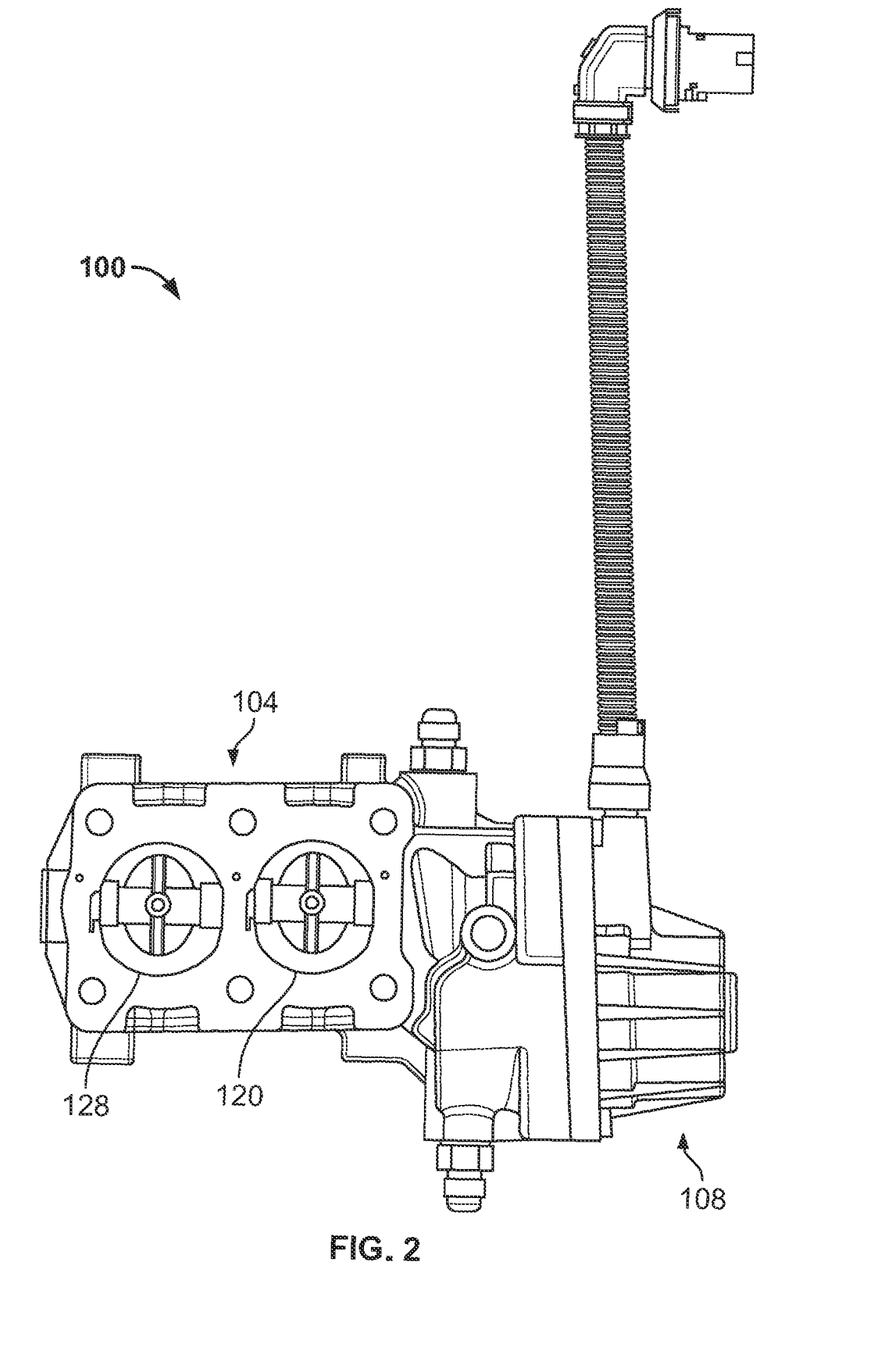
FIG. 2 is another perspective view of the rotary control valve of FIG. 1.
Figure 3:
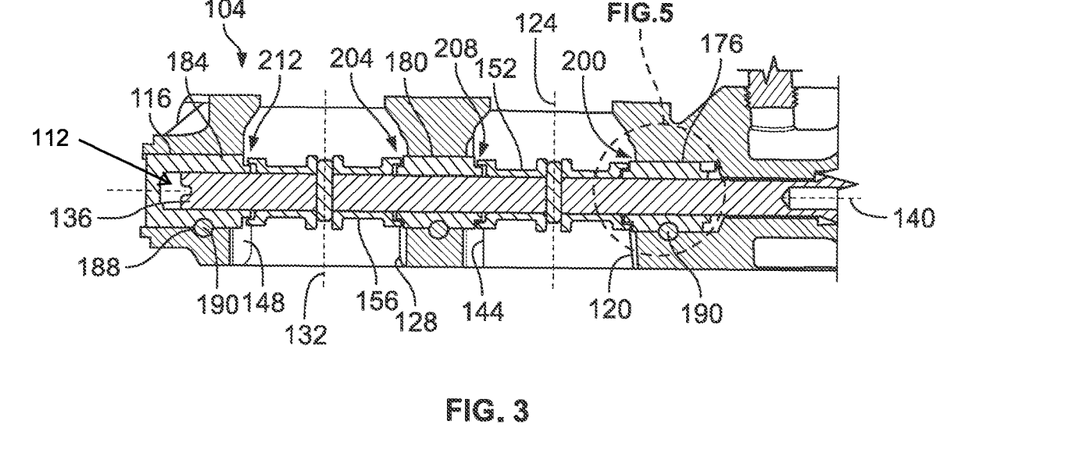
FIG. 3 is a cross-sectional view of a portion of the rotary control valve of FIG. 1.

The valve body 104 generally includes a bore 116 and at least one opening (e.g., flap opening) formed therein and disposed adjacent to the bore 116. As best illustrated in FIGS. 1-3, the valve body 104 in this example includes a first flap opening 120 that extends along a first flap axis 124 and a second flap opening 128 that extends along a second flap axis 132, such that the second flap opening 128 is spaced from the first flap opening 120. In other examples, however, the valve body 104 may only include a single flap opening or may include more than two flap openings (e.g., three flap openings, four flap openings, etc.).

The valve trim assembly 112 generally includes a valve shaft 136 coupled to the valve body 104. The actuator 108 is operatively coupled to the valve shaft 136 to control the position of the valve shaft 136 within the valve body 104. In this example, the actuator 108 is directly coupled to the valve shaft 136. In other examples, however, the actuator 108 may be coupled to the valve shaft 136 via a linkage, a belt, or the like. As best illustrated in FIG. 3, the valve shaft 136 is disposed in the bore 116 and extends through the first flap opening 120 and the second flap opening 128 along a longitudinal axis 140 that is substantially perpendicular, if not entirely perpendicular, to the first flap axis 124 and the second flap axis 132. In other examples, however, the valve shaft 136 may be arranged differently relative to the valve body 104.

Figure 4:
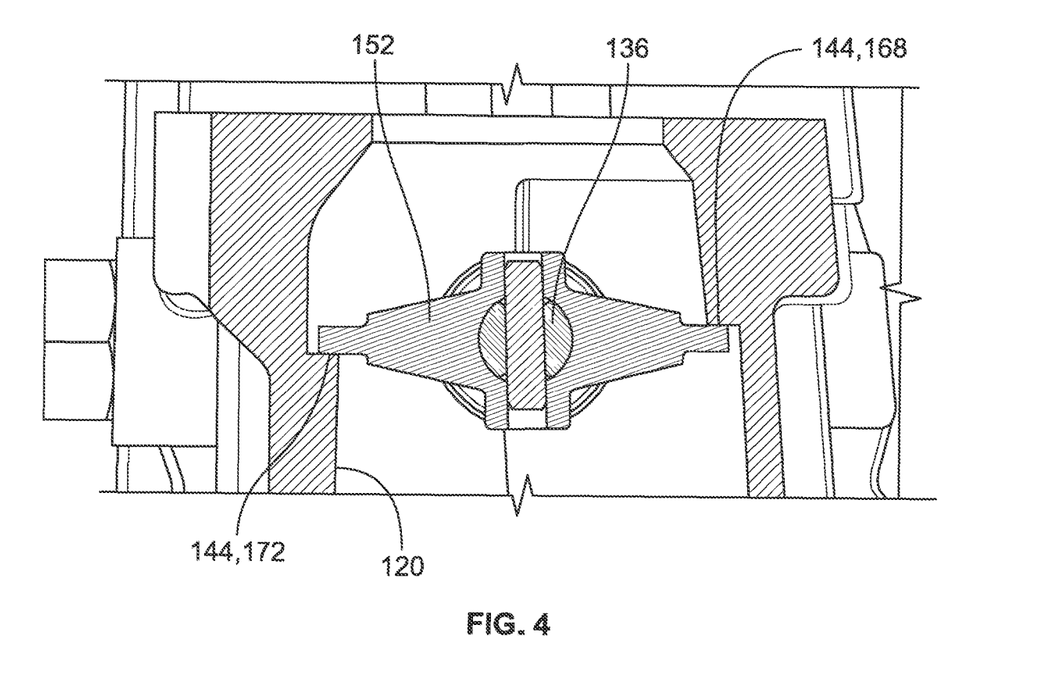
FIG. 4 is a top view of a portion of FIG. 3.

The valve trim assembly 112 also generally includes at least one valve seat coupled to the valve body 104. As best illustrated in FIGS. 3 and 4, the valve trim assembly 112 in this example includes a first valve seat 144 and a second valve seat 148. In other examples, e.g., when the valve body 104 only includes a single flap opening or may include more than two flap openings, the valve trim assembly 112 may include more or less valve seats.

The first valve seat 144 in this example is defined by a first shelf that is integrally formed with the valve body 104 and extends inwardly into the first flap opening 120. As illustrated in FIGS. 3 and 4, the first shelf extends inwardly in a direction that is substantially, if not entirely, perpendicular to the longitudinal axis 140 and the first flap axis 124. In other examples, however, the first valve seat 144 may be otherwise coupled (e.g., removably coupled) to the valve body 104 and/or be oriented in a different manner relative to the longitudinal axis 140 and/or the first flap axis 124. Similarly, the second valve seat 148 in this example is defined by a second shelf that is integrally formed with the valve body 104 and extends inwardly into the second flap opening 128. The second shelf is not illustrated in FIGS. 3 and 4, but it will be appreciated that the second shelf also likewise extends inwardly in a direction that is substantially, if not entirely, perpendicular to the longitudinal axis 140 and the second flap axis 132. Nonetheless, the second valve seat 148 may be otherwise coupled (e.g., removably coupled) to the valve body 104 and/or be oriented in a different manner relative to the longitudinal axis 140 and/or the second flap axis 132.

The valve trim assembly 112 further generally includes at least one control element carried by the at least one valve shaft and movably disposed in the valve body 104 relative to the at least one valve seat, respectively. As best illustrated in FIGS. 3 and 4, the valve trim assembly 112 in this example includes a first control element 152 and a second control element 156. In other examples, e.g., when the valve body 104 only includes a single flap opening or may include more than two flap openings, the valve trim assembly 112 may include more or less control elements.

The first control element 152 in this example takes the form of a valve flap having a substantially oval shape. The first control element 152 is coupled (e.g., pinned) to and carried by the valve shaft 136 and movably disposed in the first flap opening 120 relative to the first valve seat 144. More particularly, the first control element 152 is movably disposed between a closed position, in which the first control element 152 sealingly engages the first valve seat 144, thereby closing the rotary control valve 100, and an open position, in which the first control element 152 is spaced from the first valve seat 144, thereby opening the rotary control valve 100 and allowing fluid to flow through the first flap opening 120. The second control element 156 in this example also takes the form of a valve flap having a substantially oval shape identical to the shape of the first control element 152. The second control element 156 is also coupled (e.g., pinned) to and carried by the valve shaft 136 (albeit at a position further from the actuator 108 than the first control element 152) and movably disposed in the second flap opening 128 relative to the second valve seat 148. More particularly, the second control element 156 is movably disposed between a closed position, in which the second control element 156 sealingly engages the second valve seat 148, thereby closing the rotary control valve 100, and an open position, in which the second control element 156 is spaced from the second valve seat 148, thereby opening the rotary control valve 100 and allowing fluid to flow through the second flap opening 128.

In other examples, however, the first control element 152 and the second control element 156 may instead take the form of a flap having a different shape (e.g., a circular shape, a rectangular shape), a disk (e.g., a butterfly disk), a plug, or another suitable control element. In any event, because the first control element 152 and the second control element 156 are both carried by the valve shaft 136, it will be appreciated that the first control element 152 and the second control element 156 are simultaneously movable between their respective open and closed positions. In other examples, the valve trim assembly 112 may include two valve shafts 136 coupled to the valve body 104 and to one another (e.g., via a clutch mechanism), with the first control element 152 coupled to and carried by one of the valve shafts 136 and the second control element 156 coupled to and carried by the other of the valve shafts 136. In these other examples, it will be appreciated that the first control element 152 and the second control element 156 may be simultaneously movable between their respective open and closed positions, or may be independently movable relative to one another.

Because of the structure and arrangement of the first valve seat 144, when the first control element 152 is in the closed position (as shown in FIG. 4), the first control element 152 has a face 168 that at least partially sits flush against the first valve seat 144, and a face 172 that is opposite the face 168 and at least partially sits flush against the first valve seat 144. While not illustrated herein, because of the structure and arrangement of the second valve seat 148, when the second control element 156 is in the closed position (also shown in FIG. 4), it will be appreciated that the second control element 156 also has opposing faces that each also at least partially sit flush against the second valve seat 148. As a result of the fact that the first and second control elements 152, 156 are at least partially seated directly and flush against the first and second valve seats 144, 148, respectively, a seal is formed between the first and second control elements 152, 156 and the first and second valve seats 144, 148, respectively, when the first and second control elements 152, 156 are in their respective closed positions.

The valve trim assembly 112 also generally includes at least one alignment element that is disposed in the bore 116 of the valve body 104 and surrounds the valve shaft 136 to help align the valve shaft 136 in the proper position. As illustrated in FIG. 3, the valve trim assembly 112 in this example includes three alignment elements, in the form of three bushings—a first bushing 176, a second bushing 180, and a third bushing 184—disposed in the bore 116 of the valve body 104 and surrounding different portions of the valve shaft 136. Optionally, as illustrated in FIG. 3, each of the first, second, and third bushings 176, 180, and 184 may have a groove 188 that is sized to receive a corresponding pin 190 that helps to secure that respective bushing within the bore 116. In other examples, e.g., when the valve trim assembly includes more or less valve seats and more or less control elements, the valve trim assembly 112 may include more or less bushings or the alignment elements may take a different form (e.g., when employed in lower temperature environments). As an example, the valve trim assembly 112 may instead include at least one bearing (e.g., ball bearing, needle bearing, etc.) disposed in the bore 116 to help align the valve shaft 136 in the proper position.

In some cases, the seal formed between the first and second control elements 152, 156 and the first and second valve seats 144, 148, respectively, when the first and second control elements 152, 156 are in their respective closed positions serves to effectively reduce the internal leak rate of the rotary closed valve 100 below the threshold internal leak rate. However, in many cases (e.g., when the rotary control valve 100 is employed in applications in which the threshold internal leak rate is very low and/or critical at various conditions), the seal may not reduce the internal leak rate or may reduce the internal leak rate but not to the requisite degree. Therefore, to minimize the internal leak rate, and to ensure that the internal leak rate is less than the threshold internal leak rate, the rotary control valve 100 includes at least one pressure labyrinth that is formed of a plurality of steps or transitions that require fluid flowing therethrough (i.e., leaking fluid) to change directions multiple times, thereby causing a pressure drop in the fluid flowing therethrough, i.e., increasing the turbulence and inefficiency of the fluid flow. Stated another way, the at least one pressure labyrinth allows fluid communication therethrough but does so in a manner that severely restricts the flow rate and the amount of fluid that actually flows therethrough. The at least one pressure labyrinth is also generally sized to achieve a maximum pressure drop in the fluid flowing therethrough, but also to allow or accommodate thermal expansion or contraction, depending on the given application, while still maintaining a clearance between thermally expanded or contracted components.

Figure 5:
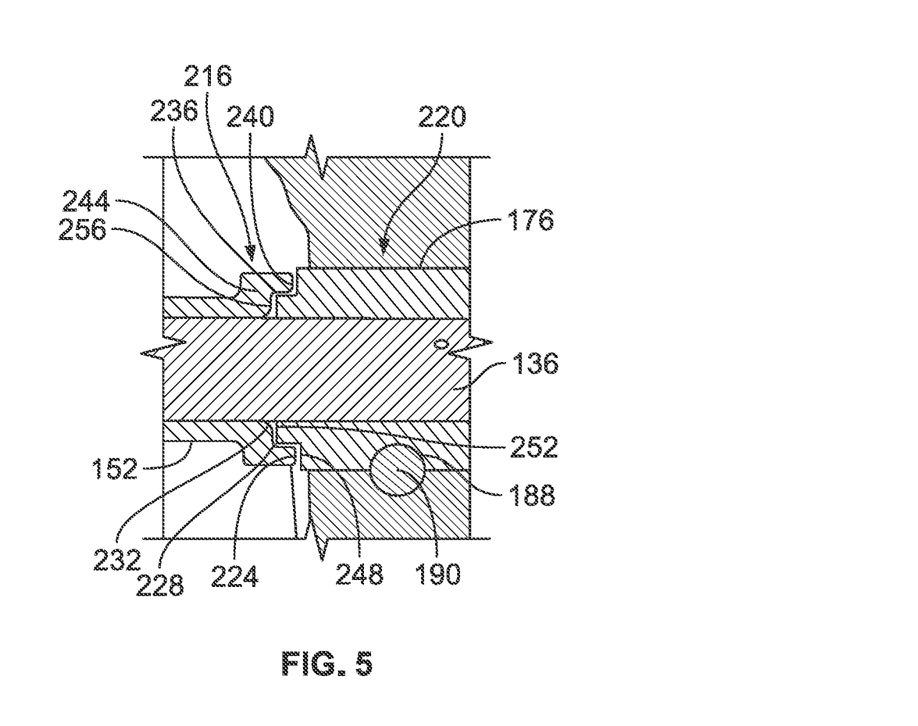
FIG. 5 is a close-up view of a portion of FIG. 3.

The rotary control valve 100 in this example includes four such pressure labyrinths, a first pressure labyrinth 200, a second pressure labyrinth 204, a third pressure labyrinth 208, and a fourth pressure labyrinth 212. As best illustrated in FIGS. 3 and 5, the first pressure labyrinth 200 and the third pressure labyrinth 208 are at least partially defined by the first control element 152, and the second pressure labyrinth 204 and the fourth pressure labyrinth 212 are at least partially defined by the second control element 156. More particularly, the first pressure labyrinth 200 is defined between the first control element 152 and the first bushing 176 (or other alignment element), the second pressure labyrinth 204 is defined between the second control element 156 and the second bushing 180 (or other alignment element), the third pressure labyrinth 208 is defined between the first control element 152 and the second bushing 180 (or other alignment element), and the fourth pressure labyrinth is defined between the second control element 156 and the third bushing 184 (or other alignment element). Thus, for example, the second and third pressure labyrinths 208, 212 are defined on opposite sides of the second bushing 180. Each of the first pressure labyrinth 200, the second pressure labyrinth 204, the third pressure labyrinth 208, and the fourth pressure labyrinth 212 may also be said to be defined by the valve body 104 and/or the valve shaft 136.

Even more particularly, the first pressure labyrinth 200 is defined by a first interface defined between a first end portion 216 of the first control element 152 and a first end portion 220 of the first bushing 176 that is disposed immediately adjacent to, and at least partially nested within (i.e., partially surrounded by), the first end portion 216 of the first control element 152. Thus, as best illustrated in FIG. 5, for example, the first pressure labyrinth 200 includes a first flow portion 224, a second flow portion 228, a third flow portion 232, a fourth flow portion 236, and a fifth flow portion 240, such that the first pressure labyrinth 200 requires fluid flowing therethrough to change directions five times. The first flow portion 224 and the fifth flow portion 240 are substantially, if not entirely, co-axial with one another, with both the first and fifth flow portions 224, 240 parallel to the first flow axis 124 and defined between an outwardly extending annular wall 244 of the first end portion 216 and an annular recess 248 formed in the first end portion 220. The second flow portion 228 and the fourth flow portion 236 are substantially, if not entirely, parallel to one another, with both the second and fourth flow portions 228, 236 parallel to the longitudinal axis 140 and defined radially inwardly of the outwardly extending annular wall 244 and radially outwardly of an outwardly extending annular wall 252 of the first end portion 220. The third flow portion 236 is substantially, if not entirely, parallel to the first and fifth flow portions 224, 240, with the third flow portion 236 defined between the outwardly extending annular wall 252 and an annular recess 256 formed in the first end portion 216.

The second pressure labyrinth 204, the third pressure labyrinth 208, and the fourth pressure labyrinth 212 are defined in a similar manner as the first pressure labyrinth 200. Thus, the second pressure labyrinth 204 is defined by a second interface defined between a first end portion of the second control element 156 and a first end portion of the second bushing 180 that is disposed immediately adjacent to, and at least partially nested within (i.e., partially surrounded by), the first end portion of the second control element 156. Meanwhile, the third pressure labyrinth 208 is defined by a third interface defined between a second end portion of the first control element 152 and a second end portion of the second bushing 180 that is disposed immediately adjacent to, and at least partially nested within (i.e., partially surrounded by), the second end portion of the first control element 152. Similarly, the fourth pressure labyrinth 212 is defined by a fourth interface defined between a second end portion of the second control element 156 and a first end portion of the third bushing 184 that is disposed immediately adjacent to, and at least partially nested within (i.e., partially surrounded by), the second end portion of the second control element 156. It will be appreciated that, like the first interface, each of the second, third, and fourth interfaces define five flow portions, such that each of the second pressure labyrinth 204, the third pressure labyrinth 208, and the fourth pressure labyrinth 212 also require fluid flowing therethrough to change directions five times. However, for the sake of brevity, further details about the five different flow portions for the second pressure labyrinth 204, the third pressure labyrinth 208, and the fourth pressure labyrinth 212 are omitted.

In other examples, the rotary control valve 100 may include more or less than four pressure labyrinths. When, for example, the rotary control valve 100 includes only a single control element, the rotary control valve 100 may only include two pressure labyrinths. Moreover, in other examples, the rotary control valve 100 may include different labyrinths than the labyrinths illustrated in FIGS. 3 and 5. In some examples, one or more of the labyrinths of the rotary control valve 100 may include more or less than five flow portions. For example, one or more of the labyrinths may include three, seven, or nine flow portions. In some examples, one or more of the labyrinths of the rotary control valve 100 may include flow portions that are oriented in a different manner relative to one another and other components of the rotary control valve 100. For example, one or more of the labyrinths may include flow portions that are oriented at an angle of less than or greater than 90 degrees (as opposed to the five flow portions 224, 228, 232, 236, 240 illustrated in FIG. 5).

While not described or illustrated herein, it will be appreciated that the rotary control valve 100 can include additional components. The rotary control valve 100 may, for example, also include a packing set disposed in the bore 116 of the valve body 104 to prevent fluid leakage. The packing set can be retained in the desired position with a packing gland, packing stud, one or more washers (e.g., Belleville washers), other components, or combinations thereof, and, as is known in the art, such components can be adjusted to alter the force imparted on the packing set, thereby altering the seal between the packing set and the valve shaft 136. The rotary control valve 100 can also include other components, e.g., a thrust bushing and a bracket (e.g., for coupling the packing set and other components to the valve body 104).

In operation, the actuator 108 drives (e.g., rotates) the valve shaft 136 and, in turn, the first and second control elements 152, 156 between their respective open positions (not shown) and their respective closed positions (shown in FIG. 3) to control the flow of fluid through the rotary control valve 100. When the first and second control elements 152, 156 are in their respective open positions, which is not shown, fluid can flow through the rotary control valve 100 via the first and second flap openings 120, 128 (which are open). Conversely, when the first and second control elements 152, 156 are in their respective closed positions, such that the first and second control elements 152, 156 sealingly engage the first and second valve seats 144, 148, the first and second flap openings 120, 128 are closed. However, as discussed above, fluid leakage around the first and second control elements 152, 156 may nonetheless still occur. But as also discussed above, this fluid will flow through the four pressure labyrinths. As this happens, the fluid flowing therethrough will change directions multiple times, thereby increasing the turbulence and inefficiency of the fluid flow and reducing the rate at which the fluid would otherwise flow. This helps to minimize the internal leak rate of the rotary control valve 100, such that the rotary control valve 100 has an internal leak rate that is lower than the acceptable or threshold internal leak rate for most, if not all, applications.

What is claimed is:

1. A rotary control valve, comprising:
    a valve body, comprising:
        a bore; and
        a first opening disposed adjacent to the bore;
    a valve shaft disposed within the bore;
    a first valve seat disposed within the valve body;
    a first control element carried by the valve shaft, the first control element movably disposed in the first opening between a closed position, in which the first control element sealingly engages the first valve seat, thereby closing the first opening, and an open position, in which the first control element is spaced from the first valve seat, thereby opening the first opening;
    a first alignment element surrounding the valve shaft and disposed in the bore, wherein the first control element has an end portion and the first alignment element has an end portion that is at least partially nested within the end portion of the first control element; and
    a first pressure labyrinth defined between the end portion of the first control element and the end portion of the first alignment element, wherein when the first control element is in the closed position, the first pressure labyrinth is configured to cause a pressure drop in fluid flowing therethrough, thereby minimizing an internal leak rate of the rotary control valve,
    wherein the end portion of the first control element has an outer projection and an inner recess, wherein the end portion of the first alignment element has an inner projection and an outer recess, wherein the outer projection faces the outer recess, and the inner projection faces the inner recess, and
    wherein the first pressure labyrinth is partially defined between the outer projection and the outer recess and partially defined between the inner projection and the inner recess.

2. The rotary control valve of claim 1, wherein the valve body further comprises a first shelf extending inwardly into the first opening, wherein the first shelf defines the first valve seat.

3. The rotary control valve of claim 2, wherein when the first control element is in the closed position, the first control element is at least partially flush against the first shelf.

4. The rotary control valve of claim 2, wherein the valve shaft extends along a longitudinal axis, and wherein the first shelf extends along an axis that is perpendicular to the longitudinal axis.

5. The rotary control valve of claim 1, wherein the valve body further comprises a second opening disposed adjacent to the bore and spaced from the first opening, the rotary control valve further comprising:
    a second valve seat disposed within the bore;
    a second control element carried by the valve shaft, the second control element movably disposed in the second opening between a closed position, in which the second control element sealingly engages the second valve seat, thereby closing the second opening, and an open position, in which the second control element is spaced from the second valve seat, thereby opening the second opening; and
    a second pressure labyrinth at least partially defined by the second control element, wherein when the second control element is in the closed position, the second pressure labyrinth is configured to cause a pressure drop in fluid flowing therethrough.

6. The rotary control valve of claim 5, further comprising a second alignment element surrounding the valve seat and disposed in the bore, wherein the second pressure labyrinth is defined between the second control element and the second alignment element.

7. The rotary control valve of claim 1, further comprising a rotary actuator coupled to the valve body, the rotary actuator operatively coupled to the first control element via the valve shaft.

8. A rotary control valve, comprising:
a valve body, comprising:
a bore;
a first opening disposed adjacent to the bore; and
a first shelf extending inwardly into the first opening;
a valve shaft disposed within the bore, wherein the valve shaft extends along a longitudinal axis and the first shelf extends along an axis that is perpendicular to the longitudinal axis;
a first control element carried by the valve shaft, the first control element movably disposed in the first opening between a closed position, in which the first control element sealingly engages the first shelf, thereby closing the first opening, and an open position, in which the first control element is spaced from the first shelf, thereby opening the first opening;
a first alignment element surrounding the valve shaft and disposed in the bore, the first alignment element comprising a groove, wherein the first control element has an end portion and the first alignment element has an end portion that is at least partially nested within the end portion of the first control element;
a pin disposed in the groove of the first alignment element to secure the alignment element within the bore; and
a first pressure labyrinth defined between the end portion of the first control element and the end portion of the first alignment element, wherein when the first control element is in the closed position, the first pressure labyrinth is configured to cause a pressure drop in fluid flowing therethrough, thereby reducing an internal leak rate of the rotary control valve,
wherein the end portion of the first control element has an outer projection and an inner recess, wherein the end portion of the first alignment element has an inner projection and an outer recess, wherein the outer projection faces the outer recess and the inner projection faces the inner recess, and
wherein the first pressure labyrinth is partially defined between the outer projection and the outer recess and partially defined between the inner projection and the inner recess.

9. The rotary control valve of claim 8, wherein when the first control element is in the closed position, the first control element is at least partially flush against the first shelf.

10. The rotary control valve of claim 8, wherein the valve body further comprises a second opening disposed adjacent to the bore and spaced from the first opening, further comprising:
a second shelf extending inwardly into the second opening;
a second control element carried by the valve shaft, the second control element movably disposed in the second opening between a closed position, in which the second control element sealingly engages the second shelf, thereby closing the second opening, and an open position, in which the second control element is spaced from the second shelf, thereby opening the second opening; and
a second pressure labyrinth at least partially defined by the second control element, wherein when the second control element is in the closed position, the second pressure labyrinth is configured to effectuate a pressure drop in the bore downstream of the second control element.

11. The rotary control valve of claim 10, further comprising a second alignment element surrounding the valve seat and disposed in the bore, wherein the second pressure labyrinth is defined between the second control element and the second alignment element.

12. The rotary control valve of claim 8, wherein the first pressure labyrinth comprises a flow path portion defined between the outer projection of the end portion of the first control element and the outer recess formed in the end portion of the first alignment element.

13. A rotary control valve, comprising:
a valve body, comprising:
a bore;
a first opening disposed adjacent to the bore; and
a second opening disposed adjacent to the bore and spaced from the first opening;
a first valve seat disposed within the first opening;
a second valve seat disposed within the second opening;
a valve shaft disposed within the bore;
a first control element carried by the valve shaft, the first control element movably disposed in the first opening between a closed position, in which the first control element sealingly engages the first valve seat, thereby closing the first opening, and an open position, in which the first control element is spaced from the first valve seat, thereby opening the first opening;
a second control element carried by the valve shaft, the second control element movably disposed in the first opening between a closed position, in which the second control element sealingly engages the second valve seat, thereby closing the second opening, and an open position, in which the second control element is spaced from the second valve seat, thereby opening the second opening;
a first alignment element surrounding the valve shaft and disposed in the bore, the first alignment element comprising a groove, wherein the first control element has an end portion and the first alignment element has an end portion that is at least partially nested within the end portion of the first control element;
a pin disposed in the groove of the first alignment element to secure the alignment element within the bore;
a first pressure labyrinth defined between the end portion of the first control element and the end portion of the first alignment element; and
a second pressure labyrinth at least partially defined by the second control element,
wherein when the first control element is in the closed position and the second control element is in the closed position, the first pressure labyrinth is configured to cause a pressure drop in fluid flowing therethrough, and the second pressure labyrinth is configured to cause a pressure drop in fluid flowing therethrough, thereby minimizing an internal leak rate of the rotary control valve,
wherein the end portion of the first control element has an outer projection and an inner recess, wherein the end portion of the first alignment element has an inner projection and an outer recess, wherein the outer projection faces the outer recess and the inner projection faces the inner recess, and
wherein the first pressure labyrinth is partially defined between the outer projection and the outer recess and partially defined between the inner projection and the inner recess.

14. The rotary control valve of claim 4, further comprising a second alignment element surrounding the valve seat and disposed in the bore, wherein the second pressure labyrinth is defined between the second control element and the second alignment element.

15. The rotary control valve of claim 14, wherein the second control element has an end portion and the second alignment element has an end portion that is at least partially nested within the end portion of the second control element, and wherein the second pressure labyrinth is defined between the end portion of the second control element and the end portion of the second alignment element.

16. The rotary control valve of claim 4, wherein the valve body further comprises first and second shelves extending inwardly into the first and second openings, respectively, wherein the first shelf defines the first valve seat and the second shelf defines the second valve seat.

17. The rotary control valve of claim 16, wherein when the first control element is in the closed position, the first control element is at least partially flush against the first shelf, and wherein when the second control element is in the closed position, the second control element is at least partially flush against the second shelf.

18. The rotary control valve of claim 16, wherein the valve shaft extends along a longitudinal axis, and wherein the first and second shelves respectively extend along first and second axes, each of the first and second axes being perpendicular to the longitudinal axis.

19. The rotary control valve of claim 15, wherein the first pressure labyrinth comprises a flow path portion defined between the outer projection of the end portion of the first control element and the outer recess formed in the end portion of the first alignment element.

* * * * *

UNITED STATES PATENT AND TRADEMARK OFFICE
CERTIFICATE OF CORRECTION

| | | |
|---|---|---|
| PATENT NO. | : 11,353,115 B2 | Page 1 of 1 |
| APPLICATION NO. | : 16/842703 | |
| DATED | : June 7, 2022 | |
| INVENTOR(S) | : Oswaldo Baasch et al. | |

It is certified that error appears in the above-identified patent and that said Letters Patent is hereby corrected as shown below:

In the Claims

Column 10, Line 22, Claim 1, "recess," should be -- recess --.

Column 13, Line 1, Claim 14, ""claim 4," should be -- claim 13, --.

Column 13, Line 13, Claim 15, "claim 4," should be -- claim 13, --.

Signed and Sealed this
Seventh Day of November, 2023

Katherine Kelly Vidal
*Director of the United States Patent and Trademark Office*